(No Model.)
R. G. THOMPSON.
CAR COUPLING.
No. 274,847.	Patented Mar. 27, 1883.
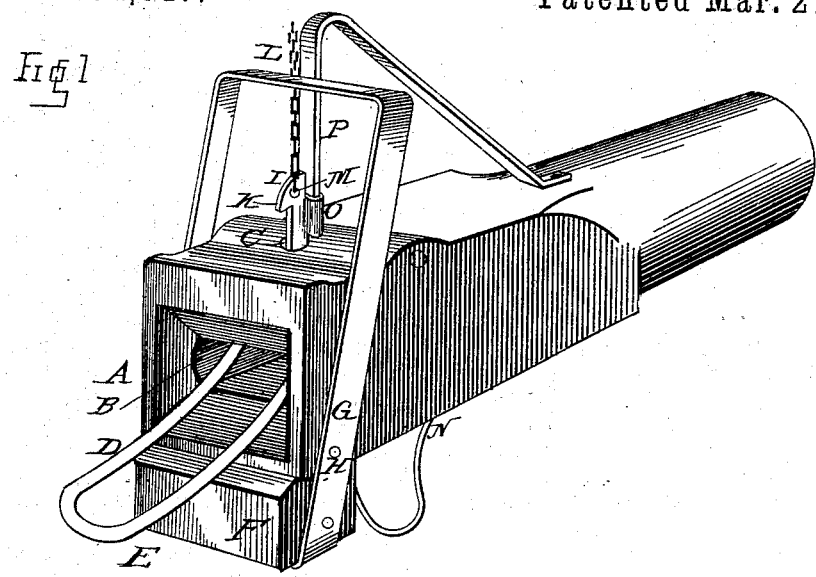
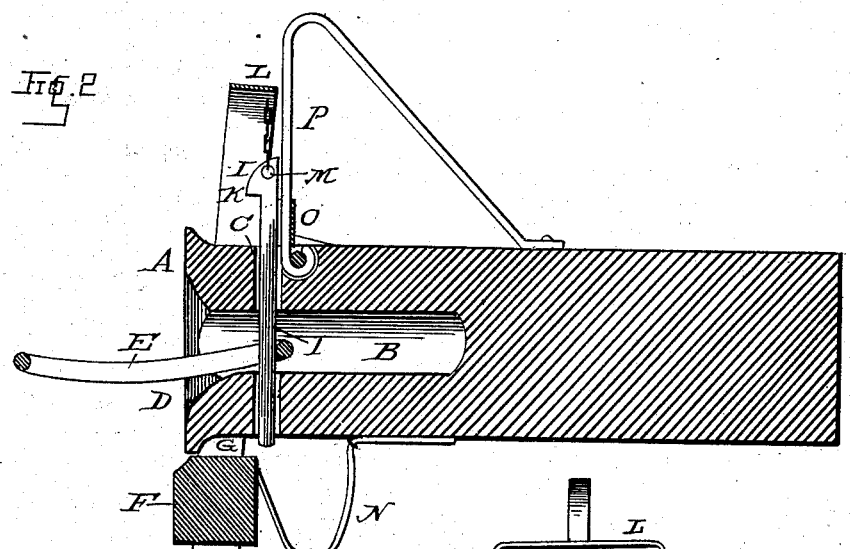
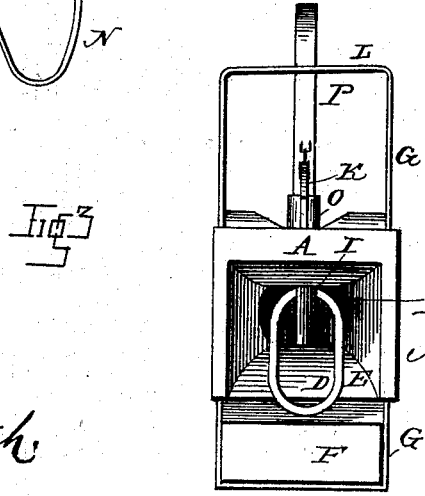
WITNESSES:
Fred. G. Dieterich
Jno. G. Finkel
Robert G. Thompson
INVENTOR.
By Louis Bagger & Co.
ATTORNEYS.

UNITED STATES PATENT OFFICE.

ROBERT G. THOMPSON, OF WHITE COTTAGE, OHIO.

CAR-COUPLING.

SPECIFICATION forming part of Letters Patent No. 274,847, dated March 27, 1883.

Application filed February 13, 1883. (No model.)

*To all whom it may concern:*

Be it known that I, ROBERT G. THOMPSON, of White Cottage, in the county of Muskingum and State of Ohio, have invented certain new and useful Improvements in Car-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved car-coupling. Fig. 2 is longitudinal vertical section through the same, and Fig. 3 is a front view of the same.

Similar letters of reference indicate corresponding parts in all the figures.

My invention has relation to automatic car-couplings; and it consists in the improved construction and combination of parts of a coupling having a separate lower bumper fastened to a pivoted frame supporting the coupling-pin, when raised, and tripping the same when the bumper is pushed inward by the opposite bumper, as hereinafter more fully described and claimed.

In the accompanying drawings, the letter A indicates the draw-head, which is of the usual construction, provided with a horizontal recess, B, for the reception of the coupling-link, and a vertical perforation, C, for the reception of the coupling-pin. The bottom D of the recess is beveled or inclined downward toward the front of the draw-head, so as to allow the link E, which is preferably curved slightly upward in both ends, to enter the recess without the need of being guided from outside. A loose bumper, F, is placed immediately below the draw-head, fastened to the lower end of a frame, G, pivoted upon bolts H upon the sides of the draw-head, and extending up above the draw-head.

I is the coupling-pin, the upper end of which is beveled and forms a forward-projecting lip, K, which, when the link is raised, catches over and rests upon the upper cross-piece, L, of frame G, and is provided with an eye, M, for the fastening of a rope or chain, or other means for raising it.

Two curved springs, N, are fastened upon the under side of the draw-head, and bear with their upward-bent free ends against the rear side of the bumper, forcing it forward, and the upper part of the frame will thus be forced rearward, and remain under the lip K when the pin is raised, the pin sliding with a box, O, upon its rear side upon a rigid upright, P, fastened upon the upper side of the draw-head.

It will thus be seen that when the pin is raised its beveled end will press the cross-piece L of the frame forward in sliding upward upon upright P, until lip K has passed the cross-piece, when the springs will force the upper end of the frame rearward under the lip, holding the pin out of the recess in the draw-head. When, now, the car to be coupled to the draw-head is moved toward it the link enters the latter, and the bumper of the opposite car will push the pivoted bumper back, allowing the pin to drop, thus effecting the coupling.

It will also be seen that the coupling device may be applied to almost any shape of draw-head in use by performing some slight changes upon the same.

Having thus described my invention, I claim and desire to secure by Letters Patent of the United States—

The herein-described car-coupling, consisting of draw-head A, having horizontal recess B, provided with inclined bottom D and vertical perforation B, frame G, pivoted upon bolts H, and having bumper F upon its lower end, curved springs N, fastened upon the under side of the draw-head, and bearing against the bumper, pin I, having upper beveled end forming lip K and eye M, and sliding with box O upon upright P, and link E, having upward-turned ends, all constructed and combined to operate as and for the purpose shown and set forth.

In testimony that I claim the foregoing as my own I have hereunto affixed my signature in presence of two witnesses.

ROBERT GEORGE THOMPSON.

Witnesses:
JAMES A. McFARLAND,
PRESLAY HALL.